United States Patent [19]

Ichikawa et al.

[11] Patent Number: 5,185,093
[45] Date of Patent: Feb. 9, 1993

[54] PROCESS FOR PRODUCING MAGNETIC METAL POWDER AND COATING FOR MAGNETIC RECORDING MEDIUM

[75] Inventors: Hiroaki Ichikawa; Yasuo Kadono; Katsuo Kojima; Hiroyuki Nakamura; Yoshio Aoki, all of Wakayama, Japan

[73] Assignee: Kao Corporation, Tokyo, Japan

[21] Appl. No.: 674,910

[22] Filed: Mar. 26, 1991

[30] Foreign Application Priority Data

Apr. 6, 1990 [JP] Japan ................................. 2-91723

[51] Int. Cl.⁵ .............................................. H01F 1/06
[52] U.S. Cl. ..................................... 252/62.51; 75/349; 427/127; 427/217; 427/377; 148/105
[58] Field of Search ................ 427/127, 217, 377; 252/62.54, 62.51; 75/349; 148/105

[56] References Cited

U.S. PATENT DOCUMENTS

| | | |
|---|---|---|
| 4,390,361 | 6/1983 | Sueyoshi .................. 148/105 |
| 4,456,475 | 6/1984 | Hirai ......................... 148/105 |
| 4,576,635 | 3/1986 | Araki ........................ 148/105 |
| 4,729,785 | 3/1988 | Schwab ..................... 75/349 |
| 4,900,590 | 2/1990 | Ritsko ....................... 427/377 |
| 5,028,278 | 7/1991 | Kadono ..................... 75/349 |
| 5,076,836 | 12/1991 | Hisaoka ..................... 75/349 |

FOREIGN PATENT DOCUMENTS

| | | |
|---|---|---|
| 154285 | 9/1985 | European Pat. Off. . |
| 58-176902 | 10/1983 | Japan . |
| 62-060205 | 3/1987 | Japan . |
| 63-64305 | 3/1988 | Japan . |
| 63-183111 | 7/1988 | Japan . |
| 1-298030 | 12/1989 | Japan . |

Primary Examiner—Prince Willis, Jr.
Assistant Examiner—Thomas Steinberg
Attorney, Agent, or Firm—Birch, Stewart, Kolasch & Birch

[57] ABSTRACT

A magnetic metal powder, having a large specific surface are, a high coercive force, a high dispersibility and an excellent corrosion resistance, is produced by converting an aciculate goethite having a silicon and/or aluminum compound layer formed thereon or an aciculate goethite modified with a metal other than iron into magnetite, forming thereon a nonferrous transition metal compound layer, further forming thereon a silicon or aluminum compound layer, and reducing the coated magnetite to prepare a magnetic metal powder mainly composed of iron and having on the surface thereof a layer containing a nonferrous transition metal element, characterized in that the formation of the silicon and/or aluminum compound layer on the aciculate goethite and/or the formation of the nonferrous transition metal layer on the magnetite are conducted while conducting dispersion by means of a disperser.

14 Claims, 1 Drawing Sheet

PROCESS FOR PRODUCING MAGNETIC METAL POWDER AND COATING FOR MAGNETIC RECORDING MEDIUM

BACKGROUND OF THE INVENTION

1. Field of the Invention

The present invention relates to a process for producing a magnetic metal powder for use in magnetic recording and particularly to a process for producing a magnetic metal powder having a high specific surface area, a high coersive force, a high dispersibility and excellent corrosion resistance.

Further, the present invention relates to a coating for a magnetic recording medium having excellent corrosion resistance and magnetic characteristics wherein use is made of a ferromagnetic powder.

2. Description of the Related Arts

The recent development of various recording systems is remarkable. Significant among these is the advance in the reduction in size and weight of a magnetic recording/reproducing apparatuses. With this advance, the demand for an increase in the performance of magnetic recording media such as magnetic tapes and magnetic disks has become increased.

A magnetic powder having a high coercive force and a high saturation magnetization is necessary for meeting the above-described demand in magnetic recording. Acicular magnetite and magnetite or the so-called cobalt-containing iron oxide prepared by modifying these magnetic iron oxide powders with cobalt have hitherto been used as a magnetic powder for magnetic recording. A ferromagnetic metal powder having higher coercive force and saturation magnetization, i.e., the so-called magnetic metal powder, has begun to be used for the purpose of producing a magnetic medium having a higher output.

Various processes have been proposed for producing a magnetic metal powder. In general, a process which comprises heating an acicular goethite, or an iron oxide particle prepared by thermally dehydrating the acicular goethite in a reducing gas atmosphere, such as hydrogen, to reduce the goethite to a metallic iron has hitherto been used from the viewpoint of profitability. In this process, however, since the reduction is conducted at a high temperature, fusion of particles, collapse of the shape, etc. tend to occur, so that satisfactory performance can not be obtained. This has led to various proposals. Examples of the proposals include a process which comprises treating goethite with water glass and firing the treated goethite for reduction (see Japanese Patent Publication No. 49722/1988), a process which comprises thermally dehydrating goethite, depositing a silicon compound on the surface of the goethite and heating the goethite for reduction (see Japanese Patent Laid-Open No. 80901/1984) and a process which comprises coating goethite with aluminum phosphate and heating the coated goethite for reduction (see Japanese Patent Laid-Open No. 67705/1988).

However, the problems which can be solved by the above-described proposals are limited to the case where the particle diameter is relatively large, and these proposals are unsatisfactory in the case of a particulate magnetic metal powder having a high specific surface area close to 60 $m^2/g$ to cope with high-density recording in recent years.

Further the particulate magnetic metal powder has another problem. Specifically, the magnetic metal powder is chemically unstable and susceptible to a reduction in the saturation magnetization with time unfavorably. The smaller the particle, the more significant this drawback. Various proposals have been made for the purpose of solving this drawback. The present inventors have found that the formation of a surface transition metal layer contributes to an improvement in the oxidation resistance, and already filed patent applications (see Japanese Patent Laid-Open Nos. 62205/1988 and 64006/1989). The above-described methods of approach to the problems exhibit a significant effect when the particle diameter is relatively large. In the case of a fine particle, although they bring about oxidation resistance superior to that of the case where no treatment is conducted, the effect attained is not satisfactory yet.

An object of the present invention is to prevent the occurrence of sintering of particles with each other in the step of producing a particulate magnetic metal powder and to provide a process for producing a magnetic metal powder having excellent magnetic characteristics and oxidation resistance and a coating for a magnetic recording medium wherein use is made of said magnetic metal powder.

SUMMARY OF THE INVENTION

The present inventors have made studies on the process of obtaining a magnetic metal powder from goethite and, as a result, have found that easy prevention of sintering and retention of shape during reduction and further improved oxidation resistance of the resultant metal powder can be attained by interrupting the reduction in the stage of magnetite produced during the reduction, forming a nonferrous transition metal compound layer on the magnetite and further forming a silicon compound layer thereon, and reducing the coated magnetite to a metal powder and that the effect becomes more significant through the use of a magnetite having a particular hysteresis, thus filing a patent application (see Japanese Patent Application No. 261011/1989). The present inventors have made further studies and, as a result, have found that the dispersibility can be improved while maintaining the corrosion resistance by conducting, under particular conditions, the formation of a silicon and/or aluminum compound layer on goethite and the formation of a nonferrous transition metal compound layer on magnetite, which has led to the completion of the present invention.

Accordingly, the present invention relates to a process for producing a particulate magnetic metal powder having excellent oxidation resistance, retention of shape and dispersibility by converting an aciculate goethite having a silicon and/or aluminum compound layer formed thereon or an acicular goethite modified with a metal other than iron into magnetite, forming thereon a nonferrous transition metal compound layer, further forming thereon a silicon or aluminum compound layer, and reducing the coated magnetite to give a magnetic metal powder mainly composed of iron and having on the surface thereof a layer containing a nonferrous transition metal element, characterized in that the formation of the silicon and/or aluminum compound layer on the aciculate goethite and/or the formation of the nonferrous transition metal layer on the magnetite are conducted while conducting dispersion by means of a disperser, and a coating for a magnetic recording medium characterized by comprising a magnetic metal powder produced by said process.

DETAILED DESCRIPTION OF THE INVENTION

In general, a process for preparing a slurry by mixing a powder with a liquid involves various operations for homogenizing a mixture of the powder with the liquid, such as dispersion, mixing, agitation, etc. On the other hand, as opposed to mere mixing and agitation, the term "dispersion by means of a disperser" used in the present invention is intended to mean applying a power above a predetermined value per unit amount of liquid. Specifically, in the dispersing, mixing and agitation commonly used in the art, the agitating power per unit amount of liquid of slurry (P/V value) is 0.1 to 10 kW/m$^3$, whereas in the "dispersion by means of a disperser", the P/V value is $1 \times 10^4$ kW/m$^3$ or more, preferably $1 \times 10^6$ kW/m$^3$ or more, wherein P is the agitating power of an agitator, a disperser, etc. [kW], and V is the amount of liquid in a vessel in the case of agitation [m$^3$], and the amount of hold-up of a dispersion part in the case of a dispersion m$^3$].

Although a disperser having a dispersing mechanism using a shearing force produced by high-speed rotation suffices for use as a disperser in the present invention, a disperser having a dispersing mechanism using an ultrasonic wave in addition to the shearing force is more desirable. Although the disperser can be installed within a reaction vessel, it is more efficient to provide a circulation line outside the reaction vessel and install a disperser somewhere in the course of this line.

Although the axial ratio and size of the aciculate goethite used in the present invention may be generally such that the aciculate goethite can be used as a starting material for a magnetic metal powder, the smaller the particle diameter, the more significant the effect of the present invention.

In the present invention, the goethite is a powder mainly composed of hydrate iron oxide represented by the general formula FeOOH which exhibits main peaks at spacings of 4.18±0.05Å, 2.69±0.05Å and 2.45±0.05Å in X-ray diffraction and undergoes a weight loss of about 12% upon being heated in the air to form hematite. There occurs no problem even if it contains minor amounts of metal elements other than iron. Further, in the present invention, the magnetite is an oxide mainly composed of iron oxide which exhibits main peaks at spacings of 2.97±0.05ÅÅ, 2.53±0.05Å and 2.10±0.05Å in X-ray diffraction, undergoes a weight loss of 2.5% or more upon being heated in the air and does not exhibit substantially any peak corresponding to goethite or hematite in X-ray diffraction.

The X-ray diffraction patterns of the above-described typical powders are shown in FIG. 1. In FIG. 1, (A), (B) and (C) are diffraction patterns of goethite, magnetite and metallic iron, respectively.

In the present invention, sufficient dispersion of goethite and magnetite prior to the formation of a silicon and/or aluminum compound layer on goethite and the formation of a nonferrous transition metal compound layer on magnetite enhances the effect of the present invention.

The formation of a silicon and/or aluminum compound layer on aciculate goethite is conducted by the precipitation of insoluble matter from a solution state, the deposition of a colloidal compound, etc. Specific examples thereof include a method which comprises adding an aqueous solution of a water-soluble compound, such as water glass or sodium aluminate, to a slurry of goethite and adjusting the pH value of the system to precipitate an insoluble hydroxide and a method which comprises adding a metal alkoxide, such as tetraethoxysilane or triisopropoxyaluminum, to a goethite slurry to precipitate a hydrolysate. When use is made of a method wherein an insoluble hydroxide is precipitated, the holding of the system in a heated state for several hours after the adjustment of the pH value facilitates the formation of a silicon and/or aluminum compound layer.

The silicon compound layer and aluminum compound layer may be formed alone or in a combined form. Especially, the formation of the aluminum compound layer after the formation of the silicon compound layer renders the performance of the final magnetic metal powder excellent.

The amounts of the silicon and aluminum compound layers in terms of the atomic ratio of silicon or aluminum to iron in the goethite are 2 to 10% and 4 to 15%, respectively, and preferably 2.5 to 7% and 6 to 12%, respectively. When both the silicon compound and the aluminum compound are used, there is no particular limitation on the ratio of silicon to aluminum. However, when the aluminum compound layer is formed after the formation of the silicon compound layer, the effect of lamination can be attained in a silicon to aluminum atomic ratio of about ½ to 1/5.

The reduction from goethite to magnetite is conducted by maintaining goethite after the formation of the silicon and/or aluminum compound layer, for example, at 250° to 350° C. in a hydrogen gas stream. In this case, thermal dehydration may be conducted in the air prior to the reduction, but thermal dehydration in a reducing atmosphere is preferred for the purpose of producing a metal powder having superior properties.

As with the formation of the silicon and/or aluminum compound layer, the formation of the non-ferrous transition metal compound layer on magnetite is conducted by the precipitation of an insoluble matter from a solution state, the deposition of a colloidal compound, etc. Examples of the non-ferrous transition metal include Cr, Mn, Co and Ni. One specific example of a method of forming the above-described nonferrous transition metal compound layer is the addition of an aqueous solution of a water-soluble transition metal compound, such as cobalt sulfate, nickel sulfate or the like, to an alkaline slurry of magnetite, thereby precipitating cobalt hydroxide or nickel hydroxide. In this case, it is also useful to use a method wherein a ferrous salt, such as ferrous sulfate, is used in combination with the aqueous solution of a water-soluble transition metal compound to simultaneously precipitate ferrous hydroxide. In this case as well, the transition metal compound layer is surely formed by maintaining the system after the precipitation of a hydroxide in a heated state. The subsequent formation of the silicon or aluminum compound layer can be conducted in the same manner as that used in connection with goethite.

The amount of the nonferrous transition metal compound layer formed on magnetite should be 13 atomic % or more in terms of the nonferrous transition metal based on the total amount of iron contained in both magnetite and optionally used ferrous salt. This is because the oxidation resistance becomes insufficient when the amount of the nonferrous transition metal element is smaller than 13 atomic %.

The amounts of the silicon and aluminum compound layers as the outermost layer are 1 to 4% and 3 to 15%, respectively, in terms of an atomic ratio based on the total of the nonferrous transition metal element and iron. It becomes difficult to obtain favorable magnetic properties when the amounts are outside the above-described ranges.

The obtained magnetite having a nonferrous transition metal compound layer and a silicon or aluminum compound layer can be reduced as it is. It is also possible to further conduct a treatment with a thermosetting resin such as phenolic or furan resin. For example, the treatment with a thermosetting resin may be conducted by adding to a magnetite slurry a solution of the above-described resin in a water-soluble organic solvent (acetone, ethanol or the like) to conduct insolubilization.

The magnetite having the nonferrous transition metal compound layer and the silicon or aluminum compound layer formed thereon is reduced by holding it in a hydrogen stream at 350° to 550° C.

The coating for a magnetic recording medium of the present invention comprising the above prepared metal magnetic powder having excellent oxidation resistance and magnetic properties is produced by a conventional process. For example, the metal magnetic powder is dispersed and mixed with a binder resin, an organic solvent and other necessary ingredients to prepare a magnetic coating material. A substrate, such as a polyester resin, is coated with this coating material by any means of doctor blade coating, gravure coating, reverse coating, roll coating, etc. If necessary, drying is conducted after magnetic field orientation.

Examples of the binder resin include those generally used in the art, such as polyvinyl chloride resin, vinyl chloride-vinyl acetate copolymer, cellulose resin, butyral resin, polyurethane resin, polyester resin, epoxy resin, polyether resin and isocyanate compound.

Examples of suitable organic solvents for a binder resin used include ketone solvents such as cyclohexanone, methyl ethyl ketone and methyl isobutyl ketone, ester solvents such as ethyl acetate and butyl acetate, aromatic hydrocarbon solvents such as benzene, toluene and xylene, sulfoxide solvents such as dimethyl sulfoxide, and ether solvents such as tetrahydrofuran and dioxane, and they may be used without any limitation, either alone or in the form of a mixture of two or more of them.

Various additives commonly used in the art, for example, lubricants, abrasives and antistatic agents, may properly be added to the magnetic coating material.

The coating for a magnetic recording medium thus formed is cut into a tape or a disk depending upon the applications and then assembled to give a high-performance magnetic recording medium having a high reliability.

EXAMPLES

The present invention will now be described in more detail by way of the following Examples, although it is not limited to these Examples only.

EXAMPLE 1

Figure 1:
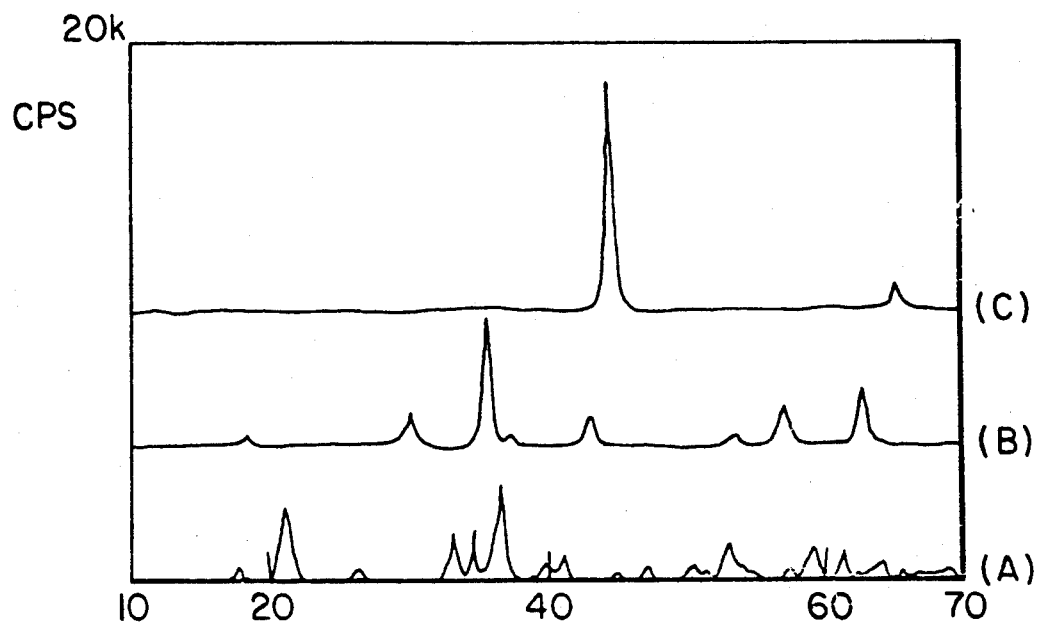
FIG. 1 is an X-ray diffraction pattern wherein (A), (B) and (C) are those of goethite, magnetite and metallic iron, respectively.
Figure 2:
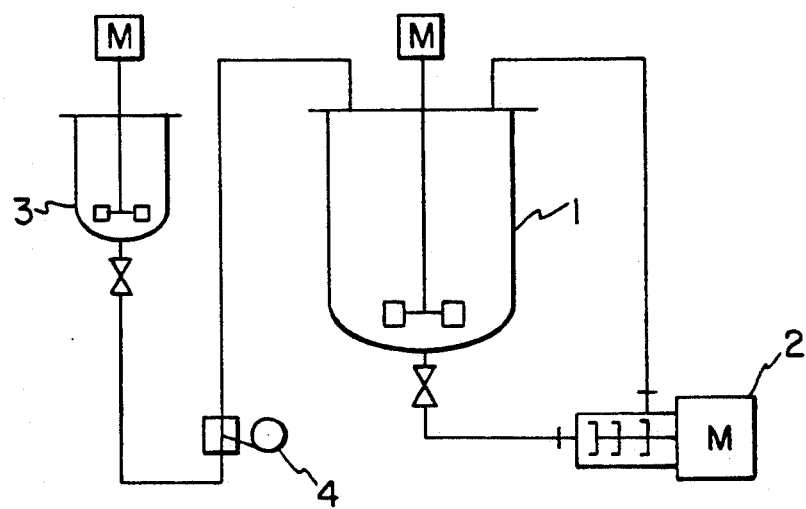
FIG. 2 is a schematic view of a circulating line provided with a disperser used in Example 1.
1: reaction vessel
2: Milder
3: dropping vessel
4: dropping pump

40 kg of goethite (major axis diameter: 0.18 μm, axial ratio: 8) was dispersed in 400 l of a 3% solution of Poise 530 (a polycarboxylic acid oligomer, a product of Kao Corp.) for about one hour by making use of an apparatus provided with a circulating line wherein a pipeline type of disperser Milder 2 (manufactured by Ebara Corporation) is provided outside a reaction vessel 1 as shown in FIG. 2. 5.5 kg of diatom No. 3 ($SiO_2$ content: 29%) is added thereto while continuing the dispersion by means of the Milder. One hour after the addition of the diatom, dilute nitric acid was added thereto to lower the pH value of the system to 6.5, and the dispersion was conducted for one hour. Then, the operation of the Milder was stopped, and reflux was conducted for one hour while conducting only agitation. Thereafter, the dispersion was cooled to 50° C. or below, and 120 l of an aqueous aluminum sulfate solution ($Al_2O_3$ content: 2.1%) was added thereto while dispersing again by means of the Milder. The pH value of the system was adjusted to 7.0 with aqueous ammonia, and reflux was conducted again for one hour while conducting only the agitation. Thereafter, filtration, washing and drying were conducted to give goethite having an aluminum compound layer on a silicon compound layer (Al/Si/Fe atomic ratio:11.4/3.1/100).

In FIG. 2, numeral 3 designates a dropping vessel and numeral 4 designates a dropping pump.

The goethite thus treated with the silicon and aluminum compounds is sieved into 48- to 64-mesh particles and reduced in a fluidized bed furnace having an inner diameter of 50 cm in a mixed gas stream having a hydrogen to nitrogen ratio of 1:1 at a gas linear velocity of 10 cm/sec at 300° C. until no peaks assignable to goethite and hematite can be observed in X-ray diffraction.

1 kg of the magnetite was dispersed in 5.4 l of an aqueous solution containing 740 g of caustic soda by making use of the same apparatus as that used above, and 4.6 l of an aqueous solution containing 1450 g of ferrous sulfate heptahydrate and 980 g of cobalt sulfate heptahydrate was added thereto while blowing a nitrogen gas into the dispersion. The mixture was allowed to react at 40° C. for 6 hr while continuing the dispersion by means of the Molder. Thereafter, the Molder was stopped, and the temperature was raised to conduct reflux for 6 hr, thereby giving a magnetite having a cobalt compound layer (Co/Fe:20% by weight) on the surface thereof. This magnetite was washed, and 30 g of Poise 530 and 70 g of water glass were added thereto and sufficiently dispersed therein. Thereafter, the pH value of the system was adjusted to 5.5 for deposition of a silicon compound.

The metal precursor thus prepared was sieved into 48- to 64-mesh particles and reduced in a fluidized bed furnace having an inner diameter of 6.2 mm in a hydrogen gas stream at a gas linear velocity of 7 cm/sec at 450° C. for 7 hr and at 500° C. for 3 hr. After the completion of the reduction, the reduction product was cooled in a nitrogen gas stream to 30° C., and the oxygen concentration was gradually raised from 500 ppm to the one in the air at a gas linear velocity of 7 cm/sec, thereby giving a magnetic metal powder 1.

The magnetic properties of the resultant magnetic powder 1 are given in Table 1 together with the results of other examples.

Then, a composition of the following coating formation was mixed for 6 hr by means of a batch sand mill, and 2.5 parts by weight of Coronate L (a product of Nippon Polyurethane Industry Co., Ltd.) was added to the mixture. The mixing was conducted for additional 15 min and the mixture was filtered to remove glass beads, thereby giving a magnetic coating material. This coating material was applied to a PET film having a thickness of 10 μm in a dry coating thickness of 3 μm, subjected to magnetic field orientation, and dried to form a magnetic layer on the PET film. Then, the magnetic layer was planished by calendering to give a coating 1.

The static magnetic properties of the coating thus obtained are given in Table 2 together with the results of other examples.

| <Coating formulation> | |
| --- | --- |
| magnetic metal powder 1 | 100 parts by weight |
| lecithin | 2 parts by weight |
| carbon black | 3 parts by weight |
| γ-alumina | 5 parts by weight |
| VAGH*1 | 15 parts by weight |
| Nippolan 2304*2 | 10 parts by weight |
| methyl ethyl ketone | 150 parts by weight |
| toluene | 50 parts by weight |
| cyclohexanone | 75 parts by weight |

Note:
*1vinyl chloride/vinyl acetate/polyvinyl alcohol copolymer, a product of Union Carbide Corp.
*2polyurethane resin, a product of Nippon Polyurethane Industry Co., Ltd.

EXAMPLE 2

A metal powder 2 and further a coating 2 were produced in the same manner as that of Example 1, except that no treatment with aluminum sulfate was conducted after the treatment of goethite with diatom No. 3 to give goethite having a silicon compound layer.

EXAMPLE 3

A metal powder 3 and further a coating 3 were produced in the same manner as that of Example 1, except that only the treatment with an aqueous aluminum sulfate solution was conducted without conducting the treatment with diatom No. 3 to give goethite having an aluminum compound layer.

EXAMPLE 4

A metal powder 4 and further a coating 4 were produced in the same manner as that of Example 1, except that 2 l of an aluminum sulfate solution was used instead of the treatment of magnetite having a cobalt compound formed thereon with water glass, and the neutralization was conducted with ammonia.

Comparative Example 1

A magnetic metal powder 11 and a coating 11 were produced in the same manner as that of Example 1, except that the dispersing by means of a Milder was conducted only in the step of dispersing goethite and magnetite but not in the subsequent steps of forming silicon and aluminum compound layers and forming the cobalt compound layer.

Comparative Example 2

A magnetic metal powder 12 and a coating 12 were produced in the same manner as that of Example 1, except that no silicon treatment was conducted after the treatment with cobalt.

Comparative Example 3

In Example 1, the amount of diatom No. 3 used for treating goethite was changed to 140 g to give a goethite having a silicon compound layer. This goethite was reduced in hydrogen to give a metal powder 13 and a coating 13.

The magnetic properties of the metal powders and coatings obtained in Example 1 to 4 and Comparative Examples 1 to 3 are given in Tables 1 and 2.

TABLE 1

| | Metal powder | Hc (Oe) | $\sigma s$ (emu/g) | $\sigma r/\sigma s$ (—) | $\sigma s'/\sigma s$ (%) |
| --- | --- | --- | --- | --- | --- |
| Ex. No. | 1 | 1600 | 123 | 0.52 | 97 |
| | 2 | 1580 | 124 | 0.52 | 96 |
| | 3 | 1520 | 125 | 0.51 | 96 |
| | 4 | 1540 | 123 | 0.51 | 95 |
| Comp. Ex. No. | 11 | 1580 | 123 | 0.49 | 97 |
| | 12 | 1520 | 126 | 0.47 | 95 |
| | 13 | 1530 | 124 | 0.47 | 94 |

Note: $\sigma s'$ is a value of $\sigma s$ after storage at 60° C. and 90% RH for 7 days.

TABLE 2

| | Coating | Hc (Oe) | Bs (Gauss) | Br/Bs (—) | SFD (—) | Bs'/Bs (%) |
| --- | --- | --- | --- | --- | --- | --- |
| Ex. No. | 1 | 1600 | 3070 | 0.85 | 0.43 | 99 |
| | 2 | 1590 | 3080 | 0.83 | 0.49 | 98 |
| | 3 | 1500 | 3120 | 0.83 | 0.47 | 99 |
| | 4 | 1550 | 3090 | 0.83 | 0.48 | 98 |
| Comp. Ex. No. | 11 | 1580 | 2960 | 0.79 | 0.58 | 98 |
| | 12 | 1520 | 2930 | 0.76 | 0.60 | 98 |
| | 13 | 1540 | 2900 | 0.77 | 0.61 | 97 |

Note: Bs' is a value of Bs after storage at 60° C. and 90% RH for 30 days.

We claim:
1. A process for producing a magnetic metal powder, which is comprised mainly of iron and having on the surface thereof a layer containing a nonferrous transition metal element comprising:
   forming on an acicular goethite containing powder, at least one silicon or aluminum compound layer;
   reducing said acicular goethite to magnetite;
   forming thereon a nonferrous transition metal compound layer;
   further forming thereon a silicon or aluminum compound layer; and
   reducing said coated magnetite to form a magnetic metal powder, wherein during the formation of the at least one silicon or aluminum compound layer on the acicular goethite, or, the formation of the nonferrous transition metal layer on the magnetite, the formation is conducted while dispersing by means of disperser having a P/V valve of at least $1 \times 10^4$ KW/m$^3$; wherein P is the agitating powder of an agitator, or a disperser, and
   V is the amount of liquid in the vessel in the case of agitation, and the amount of hold-up in the case of a dispersion.
2. The process according to claim 1, wherein said dispersion is conducted during the formation of said at least one silicon or aluminum compound layer on acicular goethite and during the formation of said nonferrous transition metal layer on magnetite.

3. The process according to claim 1, wherein a silicon compound layer and an aluminum compound layer are formed on said acicular goethite.

4. The process according to claim 3, wherein said silicon compound layer is formed before said aluminum compound layer.

5. The process according to claim 1, wherein the amount of silicon compound coated on said acicular goethite in terms of atomic ratio of silicon to goethite is 2 to 10%.

6. The process according to claim 5, wherein said ratio of silicon to goethite is 2.5 to 7%.

7. The process according to claim 1, wherein the amount of aluminum compound coated on said acicular goethite in terms of atomic ratio of aluminum to goethite is 4 to 15%.

8. The process according to claim 7, wherein said ratio of aluminum to goethite is 6 to 12%.

9. The process according to claim 4, wherein the atomic ratio of silicon to aluminum ratio is from about 1:2 to 1:5.

10. The process according to claim 1, wherein said nonferrous transition metal compound layer formed on said magnetite is selected from the group consisting of chromium, manganese, cobalt, and nickel.

11. The process according to claim 1, wherein the amount of said nonferrous transition metal compound layer formed on said magnetite is at least 13 atomic % in terms of the nonferrous transition metal based on the total amount of iron.

12. The process according to claim 1, wherein said process is carried out as a slurry.

13. The process according to claim 1, wherein said reduction of acicular goethite to magnetite is carried out by heating in a hydrogen gas stream.

14. The process according to claim 1, wherein said reduction of magnetite to metal powder is carried out by heating.

* * * * *